United States Patent [19]

Reidick

[11] Patent Number: 5,055,278

[45] Date of Patent: Oct. 8, 1991

[54] METHOD FOR DECREASING NITROGEN OXIDES (NOX) IN WASTE FURNACE GASES

[75] Inventor: Heinz Reidick, Oberhausen, Fed. Rep. of Germany

[73] Assignees: Apparatebau Rothemühle Brandt; Kritzler Gesellschaft mit beschränkter Haftung, Wenden, Fed. Rep. of Germany

[21] Appl. No.: 377,488

[22] Filed: Jul. 10, 1989

[30]  Foreign Application Priority Data

Jul. 12, 1988 [DE] Fed. Rep. of Germany ....... 3823575

[51] Int. Cl.$^5$ .......................... C01B 21/00; B01J 8/00; C10H 23/00
[52] U.S. Cl. ................................ 423/235; 423/239; 423/245.3
[58] Field of Search ................... 423/235, 235 D, 239, 423/239 A, 245.3

[56]  References Cited

U.S. PATENT DOCUMENTS

| 3,873,671 | 3/1975 | Reed et al. | 423/235 |
| 4,418,045 | 11/1983 | Sato et al. | 423/245.3 |
| 4,519,993 | 5/1985 | McGill et al. | 423/235 |
| 4,528,170 | 7/1985 | Koecker et al. | 423/245.3 |

FOREIGN PATENT DOCUMENTS

| 3335917 | 2/1985 | Fed. Rep. of Germany . |
| 3431961 | 3/1985 | Fed. Rep. of Germany . |
| 3406657 | 8/1985 | Fed. Rep. of Germany . |

OTHER PUBLICATIONS

"Technische Mitteilungen" (Technical Communications), vol. 80, No. 9, Nov./Dec. 1987, pp. 566–572.

Primary Examiner—Gregory A. Heller
Attorney, Agent, or Firm—Toren, McGeady & Associates

[57]  ABSTRACT

A procedure is disclosed for substantially decreasing the amount of nitrogen oxides ($NO_x$) in waste furnace gases during the combustion of fossil fuel, in which as a primary measure, the fuel is subjected in the combustion space to a stepped, pyrolyzing combustion with low combustion temperatures and decreased available oxygen (substoichiometric amounts) in the reaction zone and with prolonged residence times in the combustion space and then as a secondary measure, the reactive waste gas components, which are thereby formed to an increased extent, such as carbon monoxide (CO), hydrocarbons (CH), etc. are eliminated, if necessary with the addition of more air, by catalytic oxidation at a temperature within the range of 800° C. to 200° C., before the waste gases reach the atmosphere.

3 Claims, 1 Drawing Sheet

METHOD FOR DECREASING NITROGEN OXIDES (NOX) IN WASTE FURNACE GASES

BACKGROUND OF INVENTION

The invention relates to a method for substantially decreasing nitrogen oxides ($NO_x$) in waste furnace gases during the combustion of fossil fuels.

To decrease the emission of nitrogen oxides ($NO_x$) in the waste gases from power plant and industrial furnaces, furnace or primary measures or waste gas purification or secondary measures can be taken, such as are evident, for example, from "Technische Mitteilungen" (Technical Communications), volume 80, No. 9, November/December 1987, pages 566 to 572.

The furnace or primary measures for decreasing nitrogen oxide emission, however, at present have limits, where the formation of other undesirable polluting gas components, especially carbon monoxide and hydrocarbons, occurs to an increased extent. For this reason, the emission of nitrogen oxides from power plant and industrial furnaces is generally decreased by $NO_x$ waste gas purification, that is, by secondary measures, as can be understood for example, from the German Offenlegungsschriften 3,335,917, 3,406,657 and 3,431,961.

In nitrogen oxide emission reduction by $NO_x$ waste gas purification, the power plant and industrial furnaces are operated so that only the least possible amounts of polluting gas components, particularly carbon monoxide and hydrocarbons, are discharged from them together with the waste gas. This is accomplished, moreover, independently of the proportions of nitrogen oxides, which are formed in the furnaces and which are composed of combustion nitrogen oxides (thermal $NO_x$) and fuel nitrogen oxides (fuel $NO_x$).

To reduce the emission of the relatively high proportion of nitrogen oxides ($NO_x$) in the waste gases leaving power plant and industrial furnaces, these gases are then passed for selective catalytic reduction (SCR method) through or over catalysts. With the help of these catalysts and the addition of ammonia, the nitrogen oxides are converted to nitrogen and water and removed or eliminated with the waste gases. Depending on the design of the catalysts, $NO_x$ conversions of 70 to 90% can be attained. In any case, however, the catalysts require an operating temperature of 300° C. and work best only at waste gas temperatures above 350° C.

SUMMARY OF THE INVENTION

It is an object of the invention to provide a method for substantially decreasing the amount of nitrogen oxides ($NO_x$) in furnace waste gases during the combustion of fossil fuels, whereby it is possible to work optimally at waste gas temperatures ranging from 200° C. to 800° C. and which therefore can still be used effectively, when the mode of operation of the known SCR method is unreliable or even ineffective.

Another object of the invention is the provision of an apparatus for implementing a process wherein the amount of nitrogen oxides in waste furnace gases produced during the combustion of fossil fuel is substantially decreased, but the amount of reactive pollutants, such as carbon monoxide and hydrocarbons is increased.

These and other objects are accomplished by the process and apparatus described below.

Pursuant to the method of the invention, as a primary measure, fuel is subjected to a stepped, pyrolyzing combustion under conditions of: a low combustion temperature, decreased available oxygen, i.e oxygen available in a substoichiometric amount in the reaction zone, and a prolonged residence time in the combustion space and as a secondary measure, the reactive waste gas components, such as carbon monoxide, hydrocarbons, etc., which are thereby formed to an increased extent, are subsequently eliminated by catalytic oxidation at a temperature within the range of 800° C. to 200° C. If necessary, the catalytic oxidation of the reactive waste gas components is carried out with the addition of air.

An apparatus, according to the invention, for implementing the method for substantially reducing the amount of nitrogen oxides in waste furnace gas formed during the combustion of fossil fuels in an installation, such as a power plant and/or industrial furnace and the like, comprises a generator of heat or steam and a catalyst connected on the outlet side of the generator. Preferably the catalyst is capable of effecting oxidation of pollutants remaining in the waste gas stream, such as carbon monoxide and hydrocarbons, at a temperature of 800° to 200° C. The apparatus may be integrated at least partially in the air preheater/economizer of the power plant and/or industrial furnace installation.

DESCRIPTION OF THE PREFERRED EMBODIMENTS

Figure 1:
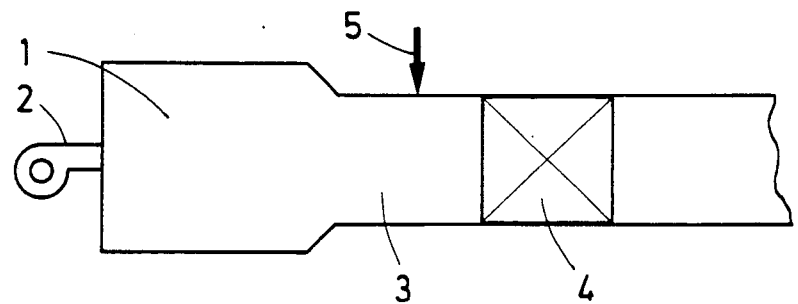
FIG. 1 shows schematically a simplified representation of an apparatus of the invention comprised of a heat generator with the catalyst inserted in the waste gas pipeline.

It has been ascertained that the process of pyrolyzing combustion according to the method of the invention can be used exclusively to decrease the amount of $NO_x$ and can be operated without complicating, limiting boundary conditions, while the subsequent catalytic reaction acts almost exclusively on the reactive waste gas components (carbon monoxide, hydrocarbons, etc.), which can also be oxidized catalytically in a low temperature range of only 200° C. and are thus removed from the waste gases.

A particular advantage of the method of the invention is that it can be used in large furnace installations without recycling the waste gas, so that not only can the plant costs be decreased, but also operating problems, which can arise particularly under partial load operation, are avoidable.

According to the invention, the possibility also exists that, simultaneously with the catalytic oxidation of the polluting gases, such as carbon monoxide, hydrocarbons, etc., the nitrogen oxides can be subjected to catalytic reduction also, without external addition of a reducing agent. The decrease in nitrogen oxides, achieved initially with furnace measures, can be increased even further in this manner. The undesirable, gaseous pollutants can thus be broken down at a relatively low temperature by the inventive method. Any heat of reaction released can be utilized again in the heat generating plant, for example, for preheating the combustion air.

For the catalytic oxidation, a catalyst in honeycomb, plate and/or packed column construction can be connected in series with the power plant or industrial furnace used for carrying out the inventive method, and, moreover, in such a manner, that it is present there in waste gases at a temperature between 800° C. and 200° C. It can also be integrated partly or completely in the air preheater for the furnace installation, the air preheater being designed either as a recuperative or as a regenerative air preheater.

If a recuperative air preheater is used, the heating surfaces, consisting, for example, of smooth or ribbed plates or pipes, can be coated on the flue gas side with the material of catalytic activity. On the other hand, when a regenerative air preheater is used, the profiled metal sheets in the storage packs are coated all around with the catalyst material. However, homogeneous honeycombs, plates or packed columns produced from catalyst material can also be used as storage compositions.

In a regenerative air preheater, a special flow rectifier or stack of heating plates acting as such a rectifier is added in the catalyst.

The integration of the catalyst in a recuperative and also a regenerative air preheater is advantageous, because a special reactor housing with a corresponding supporting construction is then avoided and, moreover, there is no additional pressure drop in the waste gas stream. A good self-cleaning effect is achieved by the incorporation of the catalyst in a regenerative air preheater, because the heater or catalyst surfaces are acted upon alternately by the heat transfer media flowing countercurrently.

The invention will be further explained with reference to the drawings.

In FIG. 1 of the drawing, a steam generator 1 is shown, which can be operated with burners 2 for burning gas oil or coal. The waste furnace gases of the heat generator 1 are passed through a waste gas pipeline 3, in which a catalyst 4 is disposed and into which air or oxygen can be blown through feed pipelines 5 ahead of the catalyst 4.

The heat generator 1 is operated by means of a so-called pyrolyzing combustion, which brings about a thermal decomposition of chemical compounds. The fuels are thus burned slowly with prolonged residence times, with the use of appropriate furnace measures, that is primary measures, while a low combustion temperature of up to 800° C. is maintained, with substoichiometric amounts of oxygen in the reaction zone.

This process of pyrolyzed combustion ensures that the nitrogen oxides ($NO_x$), irrespective of whether they are combustion nitrogen oxides—thermal $NO_x$—or fuel nitrogen oxides—fuel $NO_x$—are made harmless very extensively in the area of the furnace.

During this pyrolyzing combustion, however, undesirable, reactive, waste gas components, particularly carbon monoxide and hydrocarbons, which frequently can no longer be decomposed because of an insufficient operating temperature, are formed to a greater extent.

So that these waste gas components cannot reach the atmosphere, the waste gases from the heat generator are passed over the catalyst 4. At or in this catalyst, oxidation takes place at a temperature ranging from 800° C. to 200° C., that is, still at relatively low temperatures. This oxidation is optionally intensified by admixing additional air through pipeline 5 and thereby eliminates the pollutant gases before the waste gases reach the atmosphere.

The catalyst 4 must, of course, be so designed, that it oxidizes mainly the pollutants remaining in the waste gas stream, such as carbon monoxide (CO) and hydrocarbons (CH). Catalysts which contain platinum and rhodium or platinum and palladium are particularly suitable for this purpose.

The catalyst 4 may, however, also be so designed that, aside from the catalytic oxidation of the pollutants, such as carbon monoxide (CO) and hydrocarbons (CH), it additionally brings about the catalytic reduction of residual amounts of nitrogen oxides ($NO_x$) still contained in the waste gases.

Figure 2:
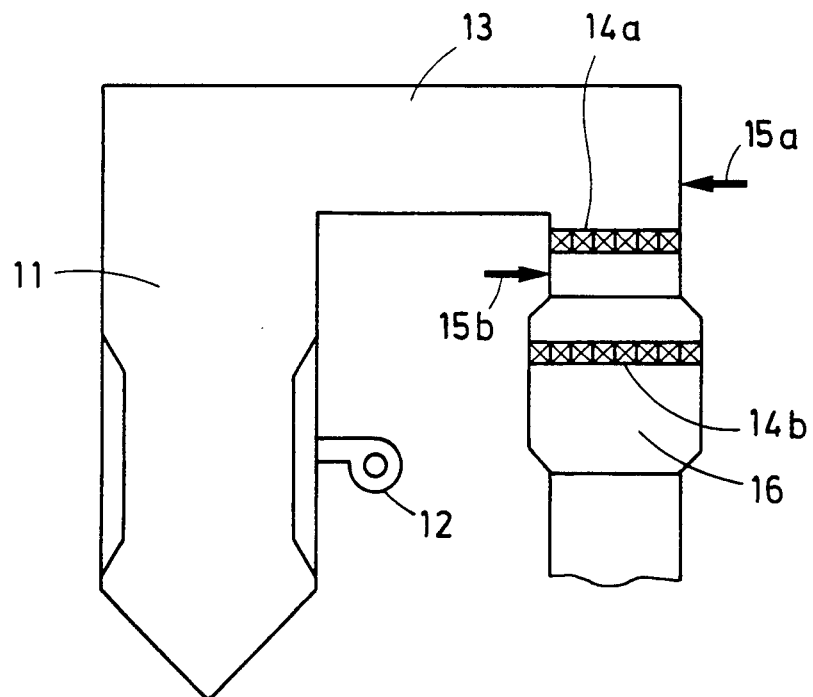
FIG. 2 also shows schematically a simplified representation of an apparatus of the invention, comprised of a steam generator with the catalyst inserted in the waste gas pipeline.

In FIG. 2 of the drawing, a steam generator 11 may be seen, which is fired over burners 12 for gas, oil or coal. The resulting waste gases are taken to the waste gas line 13, in which an air preheater 16 or an economizer is installed.

It can be inferred from FIG. 2 that a catalyst 14a can be installed ahead of and at a distance from the air preheater 16 or economizer in the waste gas pipeline 13. There is, moreover, the possibility of integrating the catalyst 14b, constructed in the form of honeycombs, plates or packed columns, in the air preheater 16, by coating the heating surfaces or storage masses of the preheater with catalyst material.

An additional pressure drop in the waste gases can be reduced by integrating the catalyst 14b in the air preheater 16.

The catalytic oxidation of the pollutant gases, such as carbon monoxide (CO) and hydrocarbon (CH), can also be improved here by blowing air or oxygen through pipeline 15a ahead of catalyst 14a or through pipeline 15b ahead of catalyst 14b into the waste gas pipeline 13.

In all cases, that is, when operating the heat generator 1 of FIG. 1 or when operating the steam generator 11 of FIG. 2, the operation can take place without recycling the flue gas, so that the expenditure for installations is correspondingly reduced. The operating problems which result from recycling the flue gas and which can occur particularly when the furnace is operated under partial load are thus reliably avoided.

By the above described removal of reactive pollutants, such as carbon monoxide (CO) and hydrocarbons (CH) by means of a subsequent reaction, namely the catalytic oxidation of the waste gases, the process of the pyrolyzing combustion for the purpose of decreasing the nitrogen oxides ($NO_x$) can be optimized, because it is no longer subject to any complicated and limiting boundary conditions, which usually must be adhered to in furnaces to avoid the formation of undesirable pollutants.

We claim:

1. A method for substantially reducing the amount of nitrogen oxides ($NO_x$) in waste furnace gas produced in an industrial plant during the generation of steam or heat by the combustion of fossilized fuel comprising, a) passing the fossilized fuel through gradual pyrolyzing combustion under conditions of low combustion temperature, available oxygen in the reaction zone decreased below the stoichiometric amount, and prolonged residence time of the fuel in the combustion space, such that said conditions are effective to substantially reduce the amount of nitrogen oxides formed from said fossilized fuel and to increase the amount of reactive waste gas components formed including carbon monoxide and hydrocarbons, then b) passing the increased amount of reactive waste gas components including carbon monoxide and hydrocarbons through catalytic oxidation at a temperature of 200° C. to 800° C., optionally with admixture of additional air, while subjecting the nitrogen oxides to catalytic reduction without addition of an external reducing agent, and c) after the nitrogen oxides have been eliminated, discharging the waste gas into the atmosphere.

2. The method of claim 1, in which additional air is fed to the waste gas after leaving the reaction zone before the waste gas is subjected to catalytic oxidation.

3. The method of claim 1, in which a low combustion temperature of up to 800° C. is maintained in the reaction zone.

* * * * *